United States Patent [19]

Anthony et al.

[11] Patent Number: 4,933,209

[45] Date of Patent: Jun. 12, 1990

[54] METHOD OF MAKING A THIN FILM RECORDING HEAD APPARATUS UTILIZING POLYIMIDE FILMS

[75] Inventors: Thomas C. Anthony, Sunnyvale; Steven L. Naberhuis, Fremont; Robert A. Garcia, San Jose; Hardayal S. Gill, Los Altos, all of Calif.

[73] Assignee: Hewlett-Packard Company, Palo Alto, Calif.

[21] Appl. No.: 372,800

[22] Filed: Jun. 28, 1989

[51] Int. Cl.$^5$ ............................................. G11B 5/42
[52] U.S. Cl. .................................... 427/116; 29/603; 336/200; 360/123; 427/129; 427/131; 430/314; 430/317
[58] Field of Search ............... 29/603, 602.1; 429/116, 429/131, 132, 129; 336/200; 360/123, 125–127; 430/314, 317, 319

[56] References Cited

U.S. PATENT DOCUMENTS 4,539,616  9/1985  Yuito et al. ........................ 360/125

OTHER PUBLICATIONS

K. Yamada et al., "A Thin Film Head for High Density Magnetic Recording Using CoZr Amorphous Film", Applied Physics, vol. 55, pp. 2235 (1984).
H. Sakakima, "Properties of Amorphous Alloy Films Mainly Composed of Co–Nb2", IEEE Transactions of Magnetics, vol. 19, p. 31 (1983).
J. Shimada, "Amorphous Co–Metal Films Produced by Sputtering", Phys. Stat. Sol. (a), vol. 83, p. 255 (1984).
Shiiki et al., "Fabrication of Coils with High Aspect Ratios for Thin Film Magnetic Heads", J. Vac. Sci. Technology, vol. A3, p. 1996 (1985).

*Primary Examiner*—Carl E. Hall
*Attorney, Agent, or Firm*—William H. F. Howard

[57] ABSTRACT

A thin film recording head which utilizes polyimide as the coil encapsulant. The polyimide encapsulant is self planarizing and lends itself to processing of the coil vias, magnetic shunt vias and apex tapers. Methods of fabricating a thin film recording head and forming coil vias, magnetic shunt vias and apex tapers are also disclosed. In general, an insulating material is deposited on a bottom magnetic yoke. A first layer of polyimide is then deposited of the insulating material. Then, a three layer photoresist structure is deposited on the first layer of polyimide, which includes a transfer layer deposited between two layers of photoresist. The top layer of photoresist is developed and the transfer layer is etched. The first layer of photoresist is then etched into the polyimide layer to form troughs therein. The coil material is then deposited into the etched troughs. The coil material comprises a layer of metal having a relatively thin passivation layer deposited thereover. The photoresist and transfer layers and unwanted coil material are then removed by ultrasonic agitation in acetone. A second layer of polyimide is then deposited over the formed coil structure to encapsulate and planarize it. The method which forms the coil vias, magnetic shunt vias and apex tapers of the recording head after formation of the encapsulated coil comprises the following steps. First, a photoresist layer is deposited on top of the second layer of polyimide. The photoresist layer is then patterned to define coil vias, magnetic shunt vias and apex taper locations. Then, this structure is heated to a temperature less than 120 degrees Celsius to round the corners of the photoresist layer at the coil via, magnetic shunt via and apex angle locations. Finally, the patterned photoresist layer and underlying polyimide layer are etched to provide the coil vias, magnetic shunt vias and apex tapers. Thereafter, the top magnetic yoke is deposited over the encapsulated structure to complete the thin film magnetic recording head.

8 Claims, 2 Drawing Sheets

METHOD OF MAKING A THIN FILM RECORDING HEAD APPARATUS UTILIZING POLYIMIDE FILMS

BACKGROUND

The present invention relates generally to thin film magnetic recording head fabrication processes, and more particularly to such processes which fabricate heads incorporating polyimide layers which encapsulate the coils thereof, and to processes which accurately control the formation of coil via, magnetic shunt via and apex taper therein.

The existing state of the art in fabricating thin film magnetic recording heads employs photoresist material as an encapsulant material surrounding the coil portion of the recording head. Use of such photoresist materials only permits processing temperatures on the order of 300 degrees Celsius. Consequently, amorphous yoke materials cannot optimally be employed in such recording heads, since post-deposition processes of such materials require processing temperatures between 350–400 degrees Celsius in order to properly tailor the magnetic properties of the recording head. The advantages of using amorphous yoke materials and processing at 350 degrees Celsius has been suggested by K. Yamada et al in an article entitled "A Thin Film Head for High Density Magnetic Recording using CoZr Amorphous Films," in Applied Physics, Volume 55, page 2235 (1984). The ability to process the encapsulated coils at such elevated temperatures is highly desirable, since it is generally necessary to tailor the magnetic properties of the films. The tailoring of the magnetic properties of such recording heads is discusses in articles by H. Sakakima entitled "Properties of Amorphous Alloy films Mainly Composed of Co-Nb2," in IEEE Transactions on Magnetics, Volume 19, page 31 (1983), and Y. Shimada in an article entitled "Amorphous Co-Metal films Produced by Sputtering," in Phys. Stat. Sol.(a), Volume 83, page 255 (1984).

The existing state of the art in fabricating thin film magnetic recording heads employs photoresist material as an encapsulant as is disclosed in U.S. Pat. No. 4,539,616, entitled "Thin Film Magnetic Head and Fabricating Method Thereof," issued to Yuito et al. An article by Shiiki et al entitled "Fabrication of Coils with High Aspect Ratios for Thin Film Magnetic Heads," in J. Vac. Sci. Technol. Volume A3, page 1996 (1985) presents substantially the same information as is contained in the above-cited patent. The motivation for incorporating polyimide as described in the above references, is to achieve high aspect ratio coils through a lift off process.

In addition, the formation of coil via, magnetic shunt via and apex angle taper of the recording head has utilized the deposition of several layers of photoresist deposited over the encapsulated coil. The layers of photoresist are photolithographically patterned and reflowed at elevated temperatures to generate the desired apex angle profile, vias and coil planarity. The reproducibility of this processing is critically dependent upon the control of resist properties and baking conditions. In addition, the coil planarity and the apex profile cannot be optimized independently, since both occur during the same reflow operation.

SUMMARY OF THE INVENTION

In order to overcome the limitations of conventional recording heads employing photoresist encapsulation materials, the present invention provides for a thin film recording head which utilizes polyimide as the encapsulant. The polyimide encapsulant is self planarizing and lends itself to processing of the coil vias, magnetic shunt vias and apex angle tapers. The present invention also provides for a method of fabricating a thin film recording head and a method of forming the coil vias, magnetic shunt vias and apex angle tapers.

The thin film magnetic recording head comprises first and second amorphous magnetic yoke material layers and has an encapsulated coil disposed therebetween. The coil comprises a vacuum deposited metal, preferrably copper or aluminum, encapsulated with first and second layers of planarizing polyimide cured at a temperature of at least 350 degrees Celsius.

One method of fabricating thin film recording heads in accordance with the principles of the present invention comprises the following steps. A first magnetic material layer is provided, which comprises the bottom yoke of the head, and an insulating material is deposited on the surface thereof. A first layer of polyimide is deposited on the exposed surface of the insulating material. Then, a first layer of photoresist is deposited on the exposed surface of the first layer of polyimide, and a transfer layer is deposited on top of the layer of photoresist. A second layer of photoresist is then deposited on top of the transfer layer.

The second layer of photoresist is then developed and the transfer layer is etched. This is done using carbon tetrafluoride plasma. The first layer of photoresist is then etched, with etching proceeding into the polyimide layer to form troughs therein to a predetermined depth which matches the desired thickness of the coil. This is done using a mixture of oxygen and carbon tetrafluoride plasma. The coil material is then deposited into the etched troughs. The coil material comprises a layer of copper having a relatively thin chromium passivation layer deposited thereover. The photoresist and transfer layers and unwanted coil material are then removed by ultrasonic agitation in acetone. A second layer of polyimide is then deposited over the formed coil structure to encapsulate and planarize it. The passivation layer prevents chemical attach of the copper layer during the polyimide deposition step. Finally, a second magnetic material layer comprising the top yoke is disposed over the second layer of polyimide to complete the thin film magnetic recording head.

Utilization of the polyimide encapsulant permits subsequent high temperature processing between 350–400 degrees Celsius, which is quite advantageous when using amorphous yoke materials. The coil fabrication process is self-planarizing, which permits more controlled processing of subsequently formed vias and apex angle for the recording head.

In addition the above basic method of the present invention, an additional method is provided which forms the coil vias, magnetic shunt vias and apex tapers of the recording head. This method comprises the following steps. First, a third photoresist layer is deposited on the second layer of polyimide prior to deposition of the second layer of magnetic yoke material. The photoresist layer is then patterned to define coil vias, magnetic shunt vias and apex angle taper locations. Then, this structure is heated to a temperature less than 120 degrees Celsius to round the corners of the photoresist at the coil via, magnetic shunt via and apex angle locations. Finally, the first and second polyimide layers are etched with the patterned photoresist layer serving as a mask, to provide the coil vias, magnetic shunt vias and apex angle tapers. Etching is performed using a surfur hexafluoride-argon-oxygen mixture or oxygensulfur hexafluoride mixture.

The above apex angle, via formation process uses dry processing, typically reactive ion etching, to etch the polyimide. Processing in this manner is a relatively simple process, is highly reproducible, and process control is maintained through plasma chemistry rather than on less controllable resist properties.

The via and apex angle process is independent of the planarization process of the first method. The critical parameters regarding the apex angle profile and gap edge position are controlled by reactive ion etching process variables, which are inherently more reproducible than photoresist reflow operations used in conventional recording head fabrication processes. The etching conditions are adjusted to control the apex angle. By increasing the oxygen content, for example in the sulfur hexafluoride-arogon-oxygen mixture, the ratio of resist to polyimide etch rates is increased, creating a more shallow apex angle. The apex angle may be steepened by reducing the etching system pressure, for example.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIG. 4a shows the surface topology of an encapsulated coil without using the coil encapsulating aspects of the present invention, while

DETAILED DESCRIPTION

Figure 1:
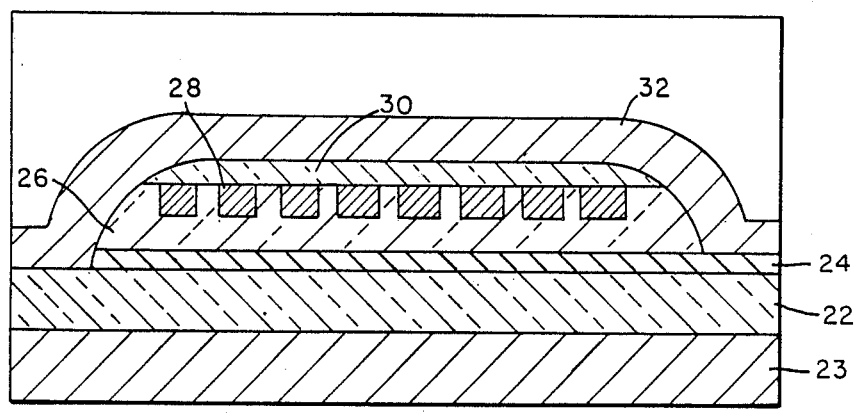
FIG. 1 is a cross sectional view of a thin film recording head made in accordance with the principles of the present invention.

FIG. 1 shows a cross sectional view of a thin film recording head 20 made in accordance with the principles of the present invention. The rcording head 20 is comprised of a bottom magnetic yoke 22, which may be formed from Cobalt hafnium Niobium amorphous alloy material, or other magnetic material with suitable magnetic properties, and which is generally deposited on a dielectric substrate 23. A dielectric layer 24 is disposed on the top surface of the bottom yoke 22. The dielectric layer 24 may be comprised of aluminum oxide ($Al_2O_3$) or other suitable dielectric insulating material. A first polyimide layer 26 is deposited on top of the dielectric layer 24. This polyimide layer is generally deposited by means of a spin deposition process and cured at a temperature of about 350 degrees Celsius on a hot plate, for example, for 30 minutes. The first polyimide layer 26 is typically deposited to a thickness of about 3 microns.

A coil 28 is then fabricated using the first polyimide layer as a substrate. The process details of this fabrication process will be discussed in detail with respect to FIGS. 2a–2d. The coil 28 is comprised of a suitable conductive material, such as copper, or aluminum, or the like. In the present invention, the coil 28 is comprised of a relatively thick layer of copper having a relatively thin passivation layer of chromium deposited thereover. The copper and chromium materials comprising the coil 128 may be deposited by means of a conventional vacuum evaporation process, or the like.

Once the coil has been formed, a second polyimide layer 30 is deposited over the coil 28 to encapsulate it. The second polyimide layer 30 is a planarizing layer, which is substantially planar in the area of the coil 28. This will be more fully discussed with reference to FIGS. 4a and 4b. Finally, a top magnetic yoke 32 is formed to enclose the encapsulated coil 28.

Figure 2A:
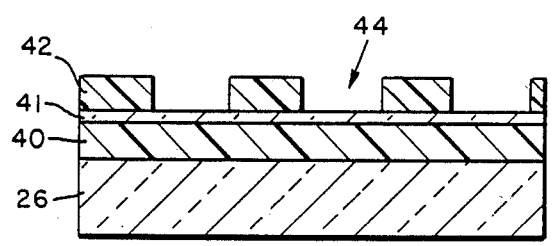
FIGS. 2a–2d illustrate the encapsulated coil fabrication method of the present invention.
Figure 2B:
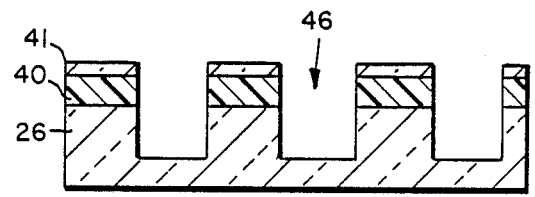

Referring to FIGS. 2a–2d, one method of forming the encapsulated coil 28 in accordance with the principles of the present invention is shown. FIG. 2a shows the first polyimide layer 26 onto which is deposited a first photoresist layer 40. The first photoresist layer 40 may comprise a conventional photoresist material such as catalog number AZ4110 manufactured by Hoechst. This photoresist layer 40 is deposited to a thickness of about 1.3 microns and baked at a temperature of about 120 degrees Celsius for 30 minutes. A relatively thin transfer layer 41 of dielectric material is deposited on top of the first photoresist layer 40. The transfer layer 41 may be comprised of a silicon dioxide material, or the like. The transfer layer 41 is generally deposited to a thickness of about 0.15 microns. A second photoresist layer 42 is then deposited on top of the transfer layer 41. The second photoresist layer (AZ4110) is generally deposited to a thickness of about 1.3 microns and baked at a temperature of about 85 degrees Celsius for 5 minutes. The second photoresist layer 42 is then patterned by exposing and developing a negative image mask, for example, FIG. 2a shows the structure achieved after the patterning has been performed.

The transfer layer 41 is then etched by means of a reactive ion etching process, using carbon tetrafluoride, or the like. The first photoresist layer 40 and the first polyimide layer 26 are then etched using reactive ion etching to form troughs in the polyimide to a depth of about 2 microns. An oxygen-carbon tetrafluoride plasma may be employed to accomplish the etching. The depth of the etch is determined by the desired thickness of the coil 28.

Figure 2C:
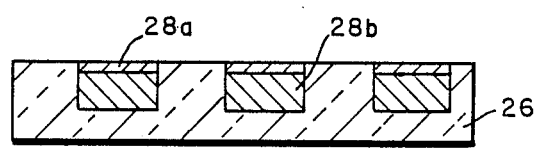
Figure 2D:
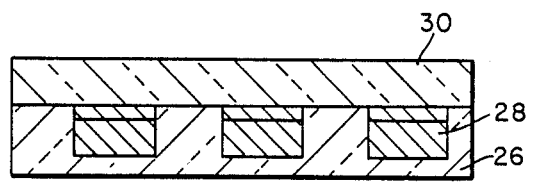

FIG. 2c shows the formation of the coil 28. The coil 28 is comprised of a metal layer 28a and a passivation layer 28b. The coil 28 is formed by depositing a relatively thick layer of a metal such as copper, for example, into the troughs formed by the prior etching step. The thickness of the copper layer, which comprises the metal layer 28a, is about 2 microns, for example. The relatively thin passivation layer 28b, which may be comprised of chromium, for example, is then deposited on top of the copper layer to a thickness of about 50 nanometers. The copper and chromium layers may generally be deposited by means of a vacuum evaporation process, or the like.

Once the coil 28 has been deposited, the structure is dissolved in acetone, for example, to lift off any extraneous copper or chromium from the surface. Finally, and referring to FIG. 2d, the second polyimide layer 30 is deposited and cured. This polyimide layer 30 is also deposited by means of a spin deposition process and cured at a temperature of about 350 degrees Celsius for 30 minutes. The coil 28 is then encapsulated between the two polyimide layers 26, 30, and is planarized by the means of the second polyimide layer 30.

The bake temperature of 120 degrees Celsius for the first photoresist layer 40 ensures that the interface between the first photoresist layer 40 and the transfer layer 41 remains intact during the reactive ion etching step, and that the photoresist layer 40 can be easily dissolved in acetone. The depth of the troughs created in the above process and the thickness of the depositions of the coil materials strongly influence the planarity of the structure. By accurately controlling these two parameters, a nominally planar coil 28 is obtained after lift-off, which relaxes the planarization requirements of the subsequently deposited second polyimide layer 30. The thin chromium passivation layer 28b on top of the copper metal layer 28a is generally necessary to preclude chemical interaction between the copper and the polyimide while curing the second polyimide layer 30.

Figure 3A:
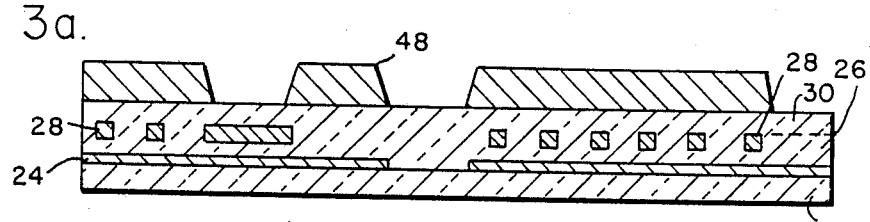
FIGS. 3a and 3b illustrate a method of fabricating coil vias, magnetic shunt vias and apex angle tapers of the recording head in accordance with the present invention.
Figure 3B:
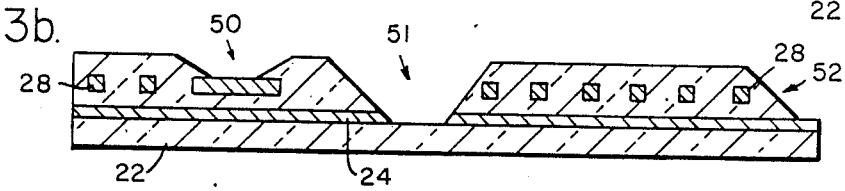

Referring to FIGS. 3a and 3b, these figures illustrate a method of fabricating coil vias, magnetic shunt vias and apex angle taper in the recording head fabricated in accordance with the present invention. With reference to FIG. 3a, the encapsulated structure formed in accordance with the discussion with reference to FIGS. 1 and 2 above is shown. On top of this structure is deposited a third photoresist layer 48. This third photoresist layer 48 may be a positive photoresist layer comprising an Axoplate AZ4620 photoresist material deposited to a thickness of about 6.5 microns. The third photoresist layer 48 is then patterned by masking and developing in a convention manner. This defines the coil vias 50, shunt vias 51, and apex angle 52 of the recording head 20. The structure is heated to a temperature less than 120 degrees Celsius to round the corners of the photoresist at the coil via, magnetic shunt via and apex angle locations. The patterned third photoresist layer 48 and the underlying polyimide layer 30 are then etched by means of a reactive ion etching process, for example. This process forms the coil vias 50, shunt vias 51, and apex angle 52 as is shown in FIG. 3b.

In conventional thin film recording heads, several layers of photoresist are patterned photolithographically and then reflowed at elevated temperatures to generate the desired apex angel profile, vias, and coil planarity. The reproducibility of this process is critically dependent upon the control of resist properties and baking conditions. In addition, the coil planarity and the apex angle profile cannot be optimized independently since both occur during the same reflow operation. To the contrary in the present invention, the coil is nominally planar as deposited. Consequently, planarization and apex angle formation are decoupled. The present apex angle process utilizes direct etching of the polyimide using a photoresist mask. Critical parameters such as the apex angle profile and gap edge position are controlled by the reactive ion etching process variables, which are inherently more reproducible than photoresist reflow operations. The selection of the reactive ion etching parameters is quite important. The selection of the reactive ion etching parameters is quite important. For example, by increasing the oxygen content in the sulfur hexafluoride-argon-oxygen etch or the sulfur hexafluoride content in the oxygen-sulfur hexafluoride etch the ratio of resist to polyimide etch rates is increased, creating a more shallow apex angle. On the other hand, for a given plasma chemistry the apex angle is steepened by reducing the reactive ion etching system pressure.

Figure 4A:
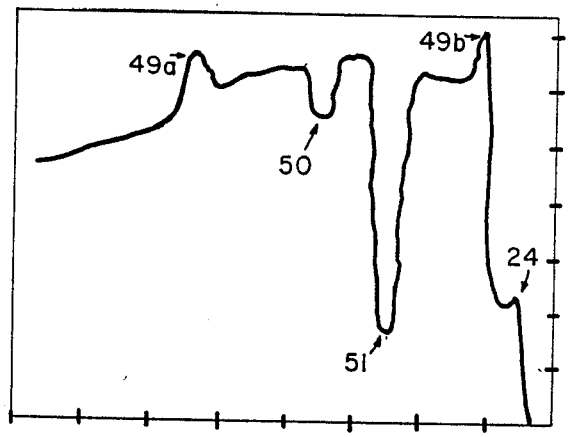
Figure 4B:
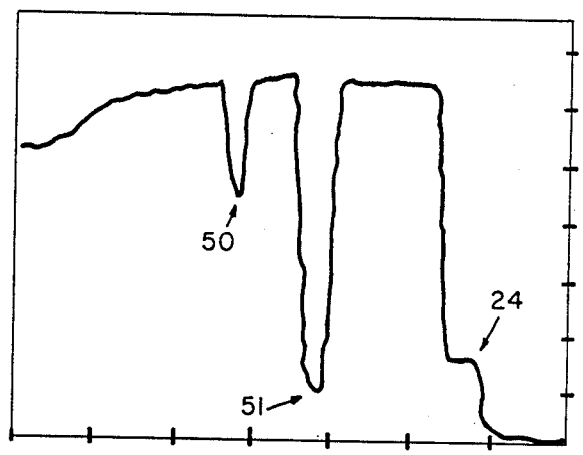
FIG. 4b shows the surface topology of an encapsulated coil using the present invention.

With reference to FIGS. 4a and 4b, these two graph show the surface topography after encapsulation of coil encapsulated with nonplanarizing polyimide, and coil enncapsulated with planarizing polyimide and fab ricated in accordance with the principles of the presen invention, respectively. In particular, as evidenced by the curve of FIG. 4a, two bumps or bulges 49a, 49b ar present in the nonplanarized polyimide coil arrange ment. As shown in FIG. 4b, however, no such bump are present. This illustrates the planarizing nature of th processing of the present invention.

Thus, the present invention has disclosed processe for fabricating thin film magnetic recording heads i which conventional photoresist coil encapsulant ha been replaced by polyimide. By substituting polyimid for photoresist permits one to use processing tempera tures as high a 400 degrees Celsius, whereas photoresis imposes an upper limit of about 300 degrees Celsius o processing performed subsequent to the encapsulatior The ability to process recording head wafers at tempea tures above 350 degrees Celsius is a tremendous advar tage if amorphous yoke materials are incorporated int the head, such as are employed in the present inventior since post deposition processing of these materials temperatures between 300 and 400 degrees Celsius often rquired to tailor the magnetic properties of th head. In addition, polyimide offers the advantages c reduced susceptibility to thermal degradation durin device operation and simplified, more reproducibl device processing.

Thus there has been described a new and improve thin film recording head apparatus and processes whic fabricate thin film recording heads incorporating pol' imide layers which encapsulate the coils, and whic accurately control the formation of coil via, magneti shunt via and apex taper in the recording heads. It is t be understood that the above-described apparatus an processes are merely illustrative of some of the man specific process embodiments which represent applic: tions of the principles of the present invention. Clearl' numerous and other arrangements can be readily d vised by those skilled in the art without departing fro: the scope of the invention.

What is claimed is:

1. A process of fabricating a thin film magnetic r cording head comprising the steps of:
   providing a first magnetic material layer;
   depositing an insulating material on a surface of tl first magnetic material layer;
   depositing a first layer of polyimide on the expose surface of the insulating material;
   depositing a first layer of photoresist on the expose surface of the first layer of polyimide;
   depositing a transfer layer on the exposed surface the layer of photoresist;
   depositing a second layer of photoresist on the e posed surface of the transfer layer;
   exposing and developing the second layer of photor sist;
   etching through the transfer layer;
   etching through the first layer of photoresist and in the polyimide layer to form troughs therein to predetermined depth;

depositing coil material into the etched troughs;
removing the photoresist and transfer layers and unwanted coil material;
depositing a second layer of polyimide on the exposed surface of the insulating material to encapsulate and planarize the coil material
forming shunt vias, coil vias and apex taper; and
depositing a second magnetic material layer on the exposed surface of the second layer of polyimide to form the thin film magnetic recording head.

2. The process of fabricating a thin film magnetic recording head of claim 1 wherein the steps of depositing first and second layers of polyimide comprise curing the layers at a temperature above 300 degrees Celsius.

3. The process of fabricating a thin film magnetic recording head of claim 1 wherein the steps of depositing first and second layers of polyimide comprise curing a layers at a temperature of at least 350 degrees Celsius.

4. The process of fabricating a thin film magnetic recording head of claim 1 wherein the step of depositing the first layer of photoresist comprises the steps of:
depositing a first layer of photoresist on the exposed surface of the first layer of polyimide; and
heating the deposited first layer of photoresist at a temperature of at least 120 degrees Celsius.

5. The process of fabricating a thin film magnetic recording head of claim 1 wherein the step of etching through the first layer of photoresist and into the polyimide layer to form troughs therein comprises the steps of:
etching through the first layer of photoresist using reactive ion etching to provide a trough depth in the polyimide substantially equal to the coil thickness.

6. The process of fabricating a thin film magnetic recording head of claim 1 wherein the step of depositing coil material into the etched troughs comprises the steps of:
depositing copper in the troughs to a predetermined depth; and
depositing a relatively thin layer of chromium on the surface of the deposited copper.

7. The process of fabricating a thin film magnetic recording head of claim 1 which further comprises the steps of:
depositing a third photoresist layer on the exposed surface of the second layer of polyimide;
patterning the photoresist layer to define coil via, magnetic shunt via and apex taper locations;
heating the patterned photoresist layer to a temperatuare less than 120 degrees Celsius to round the corners at the coil via, magnetic shunt via and apex angle locations; and
etch the patterned photoresist layer and underlying polyimide layers to provide the coil via, magnetic shunt via and apex taper.

8. In a method of making a thin film magnetic recording head comprising first and second magnetic yoke material layers having an encapsulated coil material disposed therebetween, a process of fabricating the encapsulated coil comprising the steps of:
depositing a first layer of polyimide on the exposed surface of the insulating material;
depositing a first layer of photoresist on the exposed surface of the first layer of polyimide;
depositing a transfer layer on the exposed surface of the layer of photoresist;
depositing a second layer of photoresist on the exposed surface of the transfer layer;
exposing and developing the second layer of photoresist;
etching through the transfer layer;
etching through the first layer of photoresist and into the polyimide layer to form troughs therein to a predetermined depth;
depositing coil material into the etched troughs;
removing the photoresist and transfer layers and unwanted coil material;
depositing a second layer of polyimide on the exposed surface of the insulating material to encapsulate and planarize the coil material.

* * * * *